Patented June 6, 1933

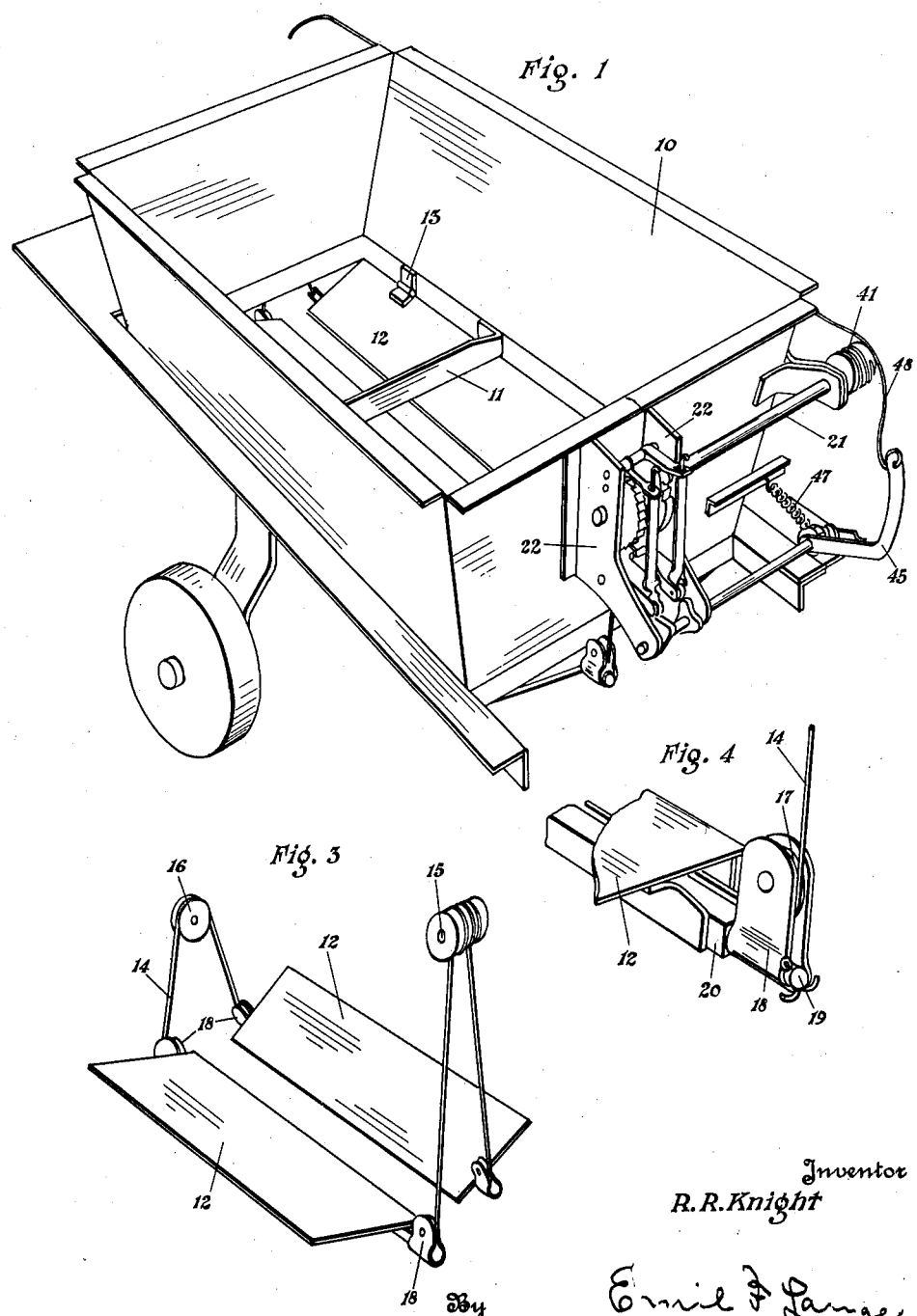

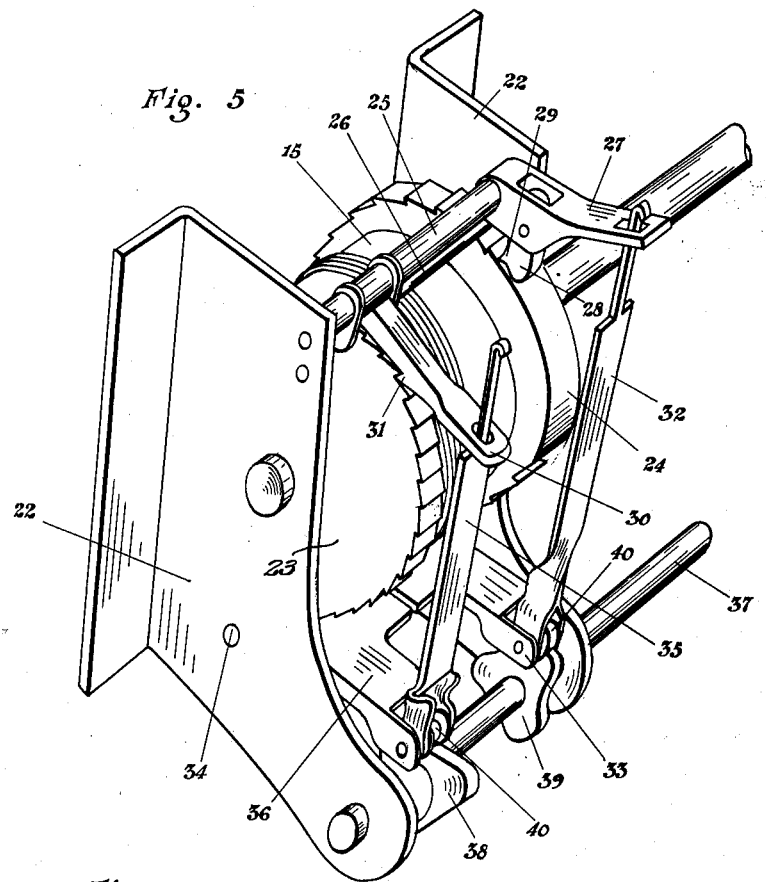

1,912,848

UNITED STATES PATENT OFFICE

ROBERT R. KNIGHT, OF LINCOLN, NEBRASKA

DUMP WAGON

Application filed March 21, 1932. Serial No. 600,159.

My invention relates to dump wagons, its primary object being the provision of a dump wagon which is certain in operation and very convenient in use.

Another of my objects is the provision of a dump wagon which may be opened or closed by means of the same control which may for convenience be a remote control.

Another of my objects is the provision of a dump wagon having a bottom opening and a closure for the opening so that the weight of the contents will not only open the closure but will also store up sufficient energy to close the closure after the dumping operation has been completed.

Another of the objects of my invention is the provision of a dump wagon having an exceedingly simple dumping mechanism which is rugged enough to withstand rough usage but which is so designed that repairs and replacements may be made with very little trouble.

Another of my objects is the provision of a dump wagon with a hinged closure having cable connections adapted to be wound on a pulley to close the closure and to maintain the closure in closed position until released.

Another of my objects is the provision of a clutch of novel form for causing the opening or closing of the closure of the dump wagon.

Having in view these objects and others which will be pointed out in the following description, I will now refer to the drawings, in which Figure 1 is a view in perspective of my dump wagon as seen from the rear and one side.

Figure 2 is a view in side elevation of my dump wagon.

Figure 3 is a view in perspective of the two leaves of the closure but showing particularly the cable and pulley arrangement for opening and closing the closure.

Figure 4 is a view in perspective of a fragmentary portion of Figure 3 and showing particularly the arrangement of one of the swiveled sheaves.

Figure 5 is a perspective view of the winding drum and the clutch.

Figure 6 is a view in side elevation of the lever and connections for actuating the cam shaft.

The dump wagon 10 itself has four side walls which slope downwardly toward each other in the usual manner to allow the contents of the wagon to fall out through the open bottom. The wagon is preferably made of sheet metal and it should be braced as by means of a transverse brace 11. Two closure members 12 are secured to the side walls by means of hinges 13. The combined or overall width of the closures 12 is equal to the width of the open bottom of the wagon 10 so that they will meet at their inner edges when in their closing position. Thus far the structure is common to many dump wagons. The dump wagon may be motor driven or horse drawn or used as a trailer or in fact it may be used as a stationary hopper. The purpose of the dump wagon is merely to receive loads which are to be discharged.

A cable 14 is secured to a winding drum 15 and it is trained over an idler pulley 16, the drum 15 being preferably at the rear of the wagon and the pulley 16 being preferably at the front. The two branches of the cable are trained over sheaves 17 which are journaled in ears 18, all as shown in Figure 3. The ears 18 are swiveled to rods 19 projecting from square members 20 which in turn are rigidly secured to the under sides of the closure members 12 and near the inner edges thereof. Suitable securing and bracing members are employed as shown in Figure 4. It will be apparent that the unwinding of the cable from the drum 15 will cause the two closure members 12 to be depressed under the weight of the load, the movement taking place in the hinges 13.

The winding drum 15 is provided with a shaft 21 which is journaled in a pair of parallel spaced ears 22 projecting rearwardly from the wagon. Integral with the winding drum 15 and the shaft 21 are a pair of ratchet wheels 23 and 24. These ratchet wheels are opposed to each other and the ratchet wheel 24 differs from the ratchet wheel 23 in that it is provided with smooth portions alternating with toothed portions. The two ratchet wheels are capable of latching the winding drum 15 against rotation in one direction or the other.

The shafts 25 and 26 are secured in parallel relation to each other and they are journaled in the ears 22. The shaft 25 carries an arm 27 having a pivoted dog 28 which in turn is provided with a tooth 29 adapted to engage in the teeth of the ratchet 24. The arm 30 is carried by the shaft 26 and it is provided with a tooth 31 for engaging the ratchet 23. The dog 28 is weighted as shown in Figure 5 so as to throw the tooth 29 into engagement with the teeth of the ratchet 24. The tooth 31, however, slips into engagement with the teeth of the ratchet 23 due to the weight of the arm 30.

Cooperating with the arm 27 is a pivoted arm 32, this arm being pivotally connected to a lever 33 which is pivotally connected to a shaft 34. The arm 32 passes through a suitable aperture in the outer end portion of the arm 27 and it is provided in the present instance with a hooked end to prevent its passage through the aperture of the arm 27. Likewise, the arm 35 cooperates with the arm 31 through a suitable aperture, the lower extremity of the arm 35 being pivotally connected with a lever 36 which is also pivotally connected to the shaft 34. It will be evident that when an upward impulse is given to either the arm 32 or the arm 35, the upward impulse will be imparted to the arm 27 or to the arm 30 to release the respective teeth from their ratchets. It will also be evident that if the arms 32 and 35 are actuated in alternation, the one tooth will be in engagement with its ratchet while the other tooth is free from its ratchet.

The cam shaft 37 is also journaled in the ears 22 beneath the lower ends of the arms 32 and 35. This cam shaft is provided with two cams 38 and 39. The cams 38 and 39 in the present instance are shown as triangular but they are so mounted on the shaft 37 that a low point in either cam will correspond to a high point in the other cam. These cams bear against the lower ends of the arms 32 and 35. In order to reduce friction, the arms 32 and 35 are provided with forked lower extremities for supporting idler wheels 40. As the shaft 37 is rotated the cams 38 and 39 alternately engage the wheels 40 to impart upward thrusts to the arms 35 and 32. The thrusts are so timed that one of the ratchet wheels will be released when the other is engaged.

The shaft 21 is extended to the side of the wagon and it is provided at its extremity with a winding drum 41 having a spiral groove as shown in Figure 1 for equalizing the tension on the cable which is to be wound on the drum 41. Reference to Figure 2 discloses the cable 42 which is connected through a spring 43 or similar tension element to the forward part of the wagon. The dumping of the contents of the wagon will therefore not only open the closures 12 but will also cause the rotation of the winding drum with its shaft 21 to store up energy in the spring 43. The tendency of this spring is to cause the unwinding of the cable 42 from the drum 41 and to thus rotate the shaft 21 in a direction to wind the cable 14 on the drum 15 to close the closures 12. In the empty wagon, the tension of the spring 43 is sufficient to maintain the closures 12 in their closed position but the holding action of the tooth 29 on the ratchet 24 is sufficient to sustain the load in the wagon so that no reverse or unwinding rotation can take place in the drum 15.

In order to make convenient the actuation of the cam shaft 37 I provide mechanism which is best shown in Figures 2 and 6. This cam shaft is also provided with a ratchet wheel 44. The lever 45 has its pivotal axis in the cam shaft 37 and it carries a pawl 46 which is adapted to engage with the teeth of the ratchet 44. A spring 47 normally maintains the lever 45 in inoperative position. The actuation of the lever 45 will cause the pawl 46 to engage the ratchet 44 to impart a step by step rotation. In order to provide a remote control for actuating the lever I secure a cable 48 to the extremity of the lever 45 and I pass this cable through eyes 49 and extend it to a position within convenient reach of the operator of the dump wagon.

In distinction to many of the prior dumping wagons, the dumping mechanism in my dump wagon is left exposed and it is so arranged that it is an easy matter to remove all or any of the parts. Such mechanism is often called upon to withstand very rough usage as on grading contracts. The soil, and especially the stones sometimes found in the soil, are very apt to injure the dumping mechanism. In designing the present dumping mechanism, I have paid particular attention to a simple but rugged construction which is much less apt to be injured than the prior constructions. The assembly of elements is so simple that the entire dumping mechanism may be disassembled and again assembled in the short space of thirty minutes. This is exceedingly important especially during the busy season when one of the parts becomes broken and requires replacement. The spring 43 for example is a tension spring at the side of the wagon and it is not subjected to the frictional strains found in coil compression springs surrounding the shafts. It is therefore much less liable to be broken but if it should become broken, it is merely necessary to detach the broken parts of the spring and to insert a new spring in its place which is a matter of only a few minutes' time.

Having thus described my invention in such full, clear, and exact terms that its construction and operation will be readily understood by others skilled in the art to which it pertains, what I claim as new and desire to secure by Letters Patent of the United States is:

1. In combination, a hopper having sides and having a hinged bottom closure, a winding drum journaled in a wall of said hopper, a cable secured to said drum and connected to said closure for moving said closure to closing position on the winding of said cable on said drum, a pawl and ratchet latch for holding said drum against cable unwinding rotation, a second pawl and ratchet latch for holding said drum against cable winding rotation, a cam shaft having a pair of cams for alternately releasing said latches, and a remote control for manually rotating said cam shaft.

2. In combination, a hopper having sides and having a hinged bottom closure, a winding drum having a shaft journaled in a wall of said hopper, a cable secured to said drum and connected to said closure for moving said closure to closing position on the winding of said cable on said drum, a second winding drum on said shaft, a cable secured to said second drum to be wound thereon, a tension spring secured at its extremities to said second named cable and to said hopper, said two cables being so connected to the respective drums that when either cable is being wound the other is unwound, a pawl and ratchet latch for holding the first said drum against cable unwinding rotation, a second pawl and ratchet latch for holding said second drum against cable unwinding rotation, a cam shaft having a pair of cams for alternately releasing said latches, and manually operable means for actuating said cam shaft.

3. In combination, a hopper having sides and having a hinged bottom closure, a cable winding shaft journaled in said hopper, a cable secured to said shaft and connected to said closure for moving said closure to closing position on the winding of said cable, a second cable secured to said shaft to be wound thereon when said first named cable is being unwound therefrom, a tension member secured at its extremities to said second cable and to said hopper whereby tension is stored up in said tension member when said closure is opened under the weight of the load, a pair of pawl and ratchet latches for alternately preventing the rotation of said shaft in one direction or the other, and a manually operable shaft having a pair of cams thereon for alternately releasing said latches.

4. In combination, a hopper having sides and having a hinged bottom closure, a winding drum having a shaft journaled in a wall of said hopper, a cable secured to said drum and connected to said closure for moving said closure to closing position on the winding of said cable on said drum, a second winding drum on said shaft, a cable secured to said second drum to be wound thereon, said second drum being provided with a helical groove for seating the cable windings, a tension spring secured at its extremities to said second named cable and to said hopper, said two cables being so connected to the respective drums that when either cable is being wound the other is unwound, a pawl and ratchet latch for holding the first said drum against cable unwinding rotation, a second pawl and ratchet latch for holding said second drum against cable unwinding rotation, a cam shaft having a pair of cams for alternately releasing said latches, and manually operable means for actuating said cam shaft.

In testimony whereof I affix my signature.

ROBERT R. KNIGHT.